(12) United States Patent
Lundin

(10) Patent No.: US 9,415,975 B2
(45) Date of Patent: Aug. 16, 2016

(54) VACUUM TUBE LIFTING DEVICE AND LIFTING HOSE AND METHOD FOR CONTROL OF A VACUUM TUBE LIFTING DEVICE

(71) Applicant: VACULEX AB, Molndal (SE)

(72) Inventor: Anders Lundin, Asa (SE)

(73) Assignee: VACULEX AB, Molndal (SE)

( * ) Notice: Subject to any disclaimer, the term of this patent is extended or adjusted under 35 U.S.C. 154(b) by 0 days.

(21) Appl. No.: 14/889,163

(22) PCT Filed: May 7, 2014

(86) PCT No.: PCT/SE2014/050564
§ 371 (c)(1),
(2) Date: Nov. 5, 2015

(87) PCT Pub. No.: WO2014/189435
PCT Pub. Date: Nov. 27, 2014

(65) Prior Publication Data
US 2016/0075537 A1    Mar. 17, 2016

(30) Foreign Application Priority Data
May 22, 2013    (SE) ...................................... 1330060

(51) Int. Cl.
| | |
|---|---|
| G06F 7/00 | (2006.01) |
| G05B 21/00 | (2006.01) |
| B66C 1/02 | (2006.01) |
| B25J 15/06 | (2006.01) |
| F16L 11/00 | (2006.01) |

(52) U.S. Cl.
CPC ........... B66C 1/0256 (2013.01); B25J 15/0616 (2013.01); B66C 1/0212 (2013.01); B66C 1/0293 (2013.01); F16L 11/00 (2013.01)

(58) Field of Classification Search
None
See application file for complete search history.

(56) References Cited

U.S. PATENT DOCUMENTS

| | | | |
|---|---|---|---|
| 5,431,469 A | 7/1995 | Ohno et al. | |
| 5,791,861 A | 8/1998 | Seelig | |
| 6,056,500 A | 5/2000 | Wicen | |
| 2002/0033611 A1 | 3/2002 | Schmalz et al. | |
| 2007/0241575 A1 | 10/2007 | Lundin | |
| 2013/0283561 A1* | 10/2013 | Miefalk | A47L 5/225 15/323 |

FOREIGN PATENT DOCUMENTS

| | | |
|---|---|---|
| SE | 446621 | 9/1986 |
| SE | 506243 | 11/1997 |

OTHER PUBLICATIONS

International Search Report and the Written Opinion of the International Searching Authority PCT/SE2014/050564 dated Jul. 29, 2014.

* cited by examiner

*Primary Examiner* — Yolanda Cumbess
(74) *Attorney, Agent, or Firm* — Young & Thompson

(57) ABSTRACT

A vacuum tube lifting device includes a lifting hose having a first end for attaching the hose and a second end for connecting elements disposed to couple the hose to a load, the hose being for connectable to an adjustable vacuum source and a control unit disposed to adjust the pressure inside the hose via input signals for achieving an extending or contracting shifting movement of the hose for shifting of a load. The device includes an arrangement for measuring a parameter proportional to the momentary length of the hose or proportional to a change in the momentary length of the hose, and to emit to the control unit at least a first signal, used by the control unit to obtain an actual value, and to automatically adjust the vacuum source for adjusting the length of the hose to a desired target value starting out from the actual value.

26 Claims, 3 Drawing Sheets

VACUUM TUBE LIFTING DEVICE AND LIFTING HOSE AND METHOD FOR CONTROL OF A VACUUM TUBE LIFTING DEVICE

TECHNICAL FIELD

The invention relates to a vacuum tube lifter, a lifting hose for a vacuum tube lifter and a method for control of a vacuum tube lifter in an energy-efficient manner.

PRIOR ART

An example of a conventional vacuum tube lifting device has a flexible, vertically placed lifting hose that at its upper end is suspended and connected to a vacuum source for adjusting the pressure in the lifting hose. Some form of lifting tool is arranged at the lower end of the lifting hose. The lifting tool can be a hook or a suction cup or the like that can be connected to a load that is to be lifted.

Furthermore, the lifting hose is extensible and contractible, i.e. the lifting hose can be compressed and extended in its longitudinal direction (vertically). The lifting hose can thus be manoeuvred by means of the vacuum source so that, upon lifting of an object, the lifting hose is packed together along its length so that the lifting hose is eventually concentrated at its suspension point, and upon lowering of the object the hose is extended. For this purpose the lifting hose is normally constructed from a wire body in the form of a helical spring, often termed a helical body, and a sheath of a substantially airtight, flexible material that encloses the body.

In one type of vacuum tube lifting devices, the lifting hose is provided with a lifting tool in the form of a suction cup, which utilises the vacuum in the lifting hose to suck fast an object that is to be lifted. A lifting device of this kind has the advantage that an object that is to be lifted in a simple and secure way can be attached to and respectively released from the lifting hose by adjusting the pressure inside the lifting hose and suction cup.

SE446621 describes a known vacuum tube lifter of the type cited above. A problem with this type of vacuum tube lifter is that they are relatively energy-intensive due to the fact that the lifting movement is controlled by adjusting the pressure level in the lifting hose only by controlling a leakage valve, which by leaking in air from the environment adjusts the pressure level which the uncontrolled vacuum source, operating at a constant capacity, can attain in the lifting hose. Apart from the work of the vacuum source being used to achieve a certain pressure level in the lifting hose, a large proportion of the work of the vacuum source is thus lost in the form of a controlled leakage flow to facilitate adjustment of the pressure level.

A further problem is the relatively high noise level as a consequence of the flow noise from the leakage valve and the high noise level from the vacuum source, which is operating with non-controlled power. Apart from the fact that the leakage noise and noise from the vacuum source are present during lifting work, the design requires the vacuum source and the leakage valve to be utilised for the vacuum tube lifter's actuator and suction cup to be located at a suitable starting height when a lifting work cycle is to be commenced by the operator. Consequently, this noise is present even when no active lifting work is being carried out.

SE506243 describes a further known vacuum tube lifter, which solves some of the above problems, since the vacuum source can be adjusted. A problem with the described vacuum tube lifter is that it does not permit automatically controlled height and speed adjustment in connection with manoeuvring of a load. This means that the operator must continuously adjust both the lifting speed and height in connection with lifting and placing of a load, which in the course of time can lead to undesirable problems with stress and fatigue. The lifted load cannot be left hanging unmonitored either due to the fact that a suddenly occurring leak that is not compensated for manually results in the load being lowered unintentionally.

A further problem is that some training is required for the operator before he feels that he is controlling the lifting movement of the vacuum tube lift in a satisfactory manner.

The solution according to the invention relates to an improved, more energy-efficient vacuum tube lifter that fully or partially eliminates these problems.

THE INVENTION

The aforementioned problems are solved by means of a vacuum tube lifter, a lifting hose for a vacuum tube lifter and a method for controlling a vacuum tube lifter in accordance with the enclosed claims.

In the text below, the term "vacuum source" relates to a device suitable for creating an underpressure, such as e.g. a compressed-air-driven ejector, a motor-driven vacuum pump or a motor-driven fan. The invention is thus applicable together with different types of vacuum sources. In the text below, the adjustment of the underpressure/air flow delivered by the vacuum source is described as a variation (increase/reduction) in its capacity. For example, for a vacuum pump, an increase in speed means that its capacity increases, whereby a stronger underpressure and/or air flow becomes accessible to the vacuum tube lifter. The resulting pressure level in the lifting hose is determined by the capacity delivered by the vacuum source and by how much air leaks into the lifting hose from the environment through valves, for example, or through the lifted load. In the text below, the term "adjustable vacuum source" relates to a vacuum source equipped with some form of power adjustment unit. The term "power adjustment unit" relates to a device that with the aid of input signals controls the capacity of the vacuum source in proportion to the level of said input signals by controlling the power supplied to the vacuum source. The controlled power supplied can comprise of e.g. electrical energy, compressed air or of another type of energy. The power adjustment unit can be built into the vacuum source or connected separately to the vacuum source. The power adjustment unit can comprise, for example, of a frequency controller, a thyristor controller, a proportional valve or a combustion engine's carburetor. The term "lifting tool" relates to a device that is adjacent to the load that is to be lifted. The lifting tool is suitably mounted fixedly or exchangeably on the manoeuvring device that the operator grips to control the vacuum tube lifter. A manoeuvring device comprises one or more handles or the like that are used when moving the vacuum tube lifter between various positions. The manoeuvring device also comprises one or more manoeuvring actuators, with which the operator controls the vacuum tube lifter vertically. A manoeuvring actuator comprises for example of a button, pressure-sensitive switch, rotary switch, rocker contact, joystick, or any other suitable actuator with which a signal can be sent to a control unit to produce a raising or lowering of the vacuum tube lifter. The manoeuvring actuator for raising/lowering the vacuum tube lifter is preferably, but not necessarily, steplessly controllable or controllable in several stages. In the text below, this type of actuator will be called "manoeuvring actuator".

The invention relates to a vacuum tube lifting device, also called a vacuum tube lifter, comprising a lifting hose having a first end for attachment of the lifting hose and a second end for connection to a means disposed to couple the lifting hose to a load. Said means can preferably comprise a lifting tool in the form of, for example, one or more suction cups that utilise the vacuum in the lifting hose to suck fast an object that is to be lifted. The lifting tool is mounted on a manoeuvring device comprising at least one manoeuvring actuator and a manually or electrically controllable first valve, or lowering valve, to achieve a lowering movement, and a controllable second valve, or bottom valve. The bottom valve is closed to maintain the underpressure in the lifting hose when the lifting tool is inactive, and open when the lifting tool sucks fast and lifts an object. As an alternative to the first valve being placed in the manoeuvring device, the first valve can be placed in another place where its outlet port is connected to the lifting hose and the inlet port is connected to the environment, for example at the upper fixed first end of the lifting hose. As an alternative to the second valve being placed in the manoeuvring device, the second valve can be placed in another place where its inlet port is connected to the suction cup and its outlet port is connected to the lifting hose, for example, it can be placed in the suction cup.

The lifting hose is adapted for connection to an adjustable vacuum source and a control unit is provided to adjust the pressure inside the lifting hose with the aid of input signals, by adjusting the capacity of the vacuum source and/or the degree of opening of the lowering valve with the aim of producing an extending or contracting shifting movement of the lifting hose for moving a load vertically. The device comprises an arrangement disposed to detect in an ongoing manner a parameter proportional to the momentary length of the lifting hose, or a parameter proportional to a change in the momentary length of the lifting hose, which measurement can take place continuously and/or intermittently. The arrangement is disposed to emit at least a first signal, which is used by the control unit to obtain an actual value, following which the control unit is disposed to automatically adjust the vacuum source and/or the first valve with the aim of adjusting the length of the lifting hose from a momentary actual value to a desired target value.

The first signal can be generated in a number of different ways, which is evident from the examples given below. The first signal can comprise of a detected parameter that is proportional to the length of the lifting hose and that the control unit can use as an actual value. The first signal can also comprise of several detected parameters that are weighed together by the control unit to be used as an actual value. Alternatively, the first signal can comprise of a detected parameter that is proportional to a change in length of the lifting hose. In this case, the control unit must process the signal before it can be used as an actual value. An example of the last-named alternative is a length change that is represented by a number of pulses. The control unit uses these pulses in combination with a known position stored in the control unit to calculate a new position, which represents the length of the lifting hose.

According to a first example, the arrangement comprises a range finder that comprises of a mechanical measuring unit, e.g. a draw-wire encoder. A draw-wire encoder comprises of a reel with a wire or thread wound on and a sensor for detecting the rotation of the reel. The first end of the wire is fixed on the reel. Then the other end of the wire is pulled out from the reel, so that the reel rotates in a first direction. A spring is provided for the reel, so that the reel rotates in a second direction when the end of the wire is released back towards the reel. The sensor that is provided to detect the rotation of the reel emits signals that can be used to calculate how much wire is unreeled at the moment. A distance measurement is obtained in this way. In this application, the draw-wire encoder is attached to a reference position at a certain distance from the fixed first end of the lifting hose and the second extensible end of the draw-wire encoder is attached to a position at a given distance from the mobile second end of the lifting hose. Alternatively, the draw-wire encoder is attached to a reference position at a given distance from the mobile second end of the lifting hose and the second extensible end of the draw-wire encoder is attached to a position at a given distance from the fixed first end of the lifting hose. An absolute sensor can be used in the draw-wire encoder to directly produce an output signal that is proportional to the momentary length of the lifting hose. Alternatively, a pulse generator can be used in the draw-wire encoder. The pulse generator measures a change in the length of the lifting hose by emitting a short signal, also termed pulse in the following text, upon each predetermined degree of rotation of the reel of the draw-wire encoder with wound-up wire. For example, the generator can be provided to emit a pulse upon each degree of rotation of the reel, i.e. 360 pulses for each revolution's rotation. The circumference of the reel is known, which means that the length of the unreeling wire can be calculated. By choosing to obtain a sufficiently large number of pulses for each revolution's rotation of the reel, the measured value for the momentary length of the lifting hose will have the desired accuracy. The pulse generator can use optical or magnetic sensors, for example. The translation of a measured value comprising pulses from the pulse generator to a length value for the momentary length of the lifting hose can be carried out either in a circuit in the pulse generator or in a separately connected computation circuit or in the control unit. In this example, the momentary length of the lifting hose is stored in the control unit, wherein pulses that indicate a change in the momentary length are used to calculate a new momentary length that can be used to adjust the length of the lifting hose to a desired target value.

According to a second example, the arrangement comprises a contactless range finder disposed to measure the length of the lifting hose between the mobile second end of the lifting hose and a reference position. The reference position can preferably, but not necessarily, comprise a principally horizontal reference surface in the environment. Examples of such contactless range finders are meters in which the distance between two positions is measured by laser or ultrasound, for example.

According to a third example, the arrangement comprises at least one load cell disposed to generate a signal proportional to the length of the lifting hose between the fixed first end of the lifting hose and the mobile second end. For example, a load cell can be coupled to a linear flexible or elastic element, for example a helical spring, which extends at least partly along the vertical extension of the lifting hose, between the mobile end of the lifting hose and a reference position. The load cell measures the spring force in the flexible element and generates a signal that is proportional to the momentary length of the lifting hose between the mobile end and the reference position. This signal is sent to the control unit, which calculates the momentary length of the lifting hose by means of signals and the spring constant of the flexible element.

According to a fourth example, the arrangement comprises at least one load cell disposed to generate a signal proportional to the weight of a possible load that is carried by this, and an underpressure sensor mounted inside the lifting hose, disposed to generate a signal that represents the momentary underpressure in the lifting hose. These signals, which represent the aforesaid first signal, are sent to the control unit, which calculates the momentary length of the lifting hose between the fixed first end of the lifting hose and the mobile second end by weighing together the signals for the load's weight and the underpressure of the lifting hose with characteristic data for the lifting hose that describe how the length of the lifting hose is changed as a function of the level of these signals.

In these second to fourth examples, the signal generated is proportional to the momentary length of the lifting hose, wherein the control unit can use this signal to adjust the length of the lifting hose to a desired target value.

When the vacuum tube lifting device is not in use, or is moved at a constant height, no signals are generated that represent a desired contracting or extending movement of the lifting hose. When the control unit detects that only the first signal is being generated, it is disposed to select a target value corresponding to the momentary actual value for the nearest preceding time when the operator ceased to adjust the length of the lifting hose by means of the manoeuvring actuator. The arrangement that is disposed to measure in an ongoing manner a parameter proportional to the momentary length of the lifting hose monitors, continuously or intermittently, any change in length of the lifting hose, and generates momentary values for the first signal. If a change in length occurs, for example due to a leak flow through a connection, a valve or the like, a first signal is emitted as an actual value to the control unit. If only a first signal is generated, the control unit is disposed to adjust the vacuum source and/or the first valve to retain a constant length of the lifting hose. In this way automatic adjustment of the vacuum source and/or the first valve takes place with the aim of adjusting said length of the lifting hose with the starting point in said actual value, this so that the length of the lifting hose is kept constant. The control unit is disposed to adjust the vacuum source to the lowest capacity, which means that the first signal is constant or within a predetermined interval. This interval can be selected so that short, repeated starts of the vacuum source are avoided, provided that a corresponding limited change in length can be accepted. If no leak flow arises and if no length change meaning that a first signal is generated happens, the control unit will adjust the vacuum source to zero, whereupon this is closed off.

The vacuum tube lifting device comprises a manoeuvring device with at least one manoeuvring actuator. The operator uses said manoeuvring actuator to achieve a change in the length of the lifting hose, with the aim of controlling the vertical movement of the mobile end of the lifting hose. When the operator acts on the manoeuvring actuator, at least a second signal is generated that represents a desired contracting or extending movement of the lifting hose, which is achieved by adjusting the pressure in the lifting hose. The manoeuvring actuator, which comprises for example of buttons (off/on) or of a steplessly adjustable actuator, generates after the action of the operator a second signal to the programmable control unit, which calculates the capacity to which it shall control the vacuum source for the length movement of the lifting hose to correspond to the movement desired by the operator by actuator action. According to one example, the control unit can also control the degree of opening of the first valve automatically in dependence on the second signal. If the control unit judges with the aid of the second signal that the first valve shall be opened, a control signal is calculated, the level of which is a function of the second signal, or alternatively is a function of both the second signal and the first signal. In the above manner the extending and contracting movement of the lifting hose can be controlled by following or at maximum reaching the preprogrammed values in the control unit for acceleration/deceleration and speed. The control unit can also be programmed to execute automatically a lift or lowering movement to a predetermined height by controlling the capacity of the vacuum source and/or the lowering valve to a level that results in the first signal approaching and finally attaining a preprogrammed value in the control unit.

Alternatively, the manoeuvring actuator can comprise suitable elements, for example buttons (off/on) or steplessly adjustable actuators, for electrical or manual direct control of the degree of opening of the lowering valve, in order to achieve an extending movement of the lifting hose.

A desired contraction of the lifting hose can be achieved by the operator acting on the manoeuvring actuator, which generates at least a second signal, which represents a desired lifting. The control unit is disposed to adjust the vacuum source to an increased capacity if the second signal represents a desired lifting of the lifting tool and a possible load. The increased capacity to which the vacuum source is adjusted depends on the desired lifting speed and/or lifting height based on the operator's actuator action (the second signal) and the actual lifting speed/lifting height (measured actual value, i.e. the first signal). Parameters such as leakage and the weight of the load influence how the first signal is changed. Maximal acceleration, speed and sensitivity to the lifting movement can be set in the control unit. By sending signals about the momentary position (the first signal) from the arrangement for measuring the length of the lifting hose to the control unit, speed and acceleration can be calculated in the control unit. With the aid of the level of the second and alternatively also of the first signal, the control unit can achieve output signals to a suitable power adjustment unit, e.g. a frequency controller, a thyristor controller or a proportional valve, which by adjusting the power supplied to the vacuum source adjusts its capacity to a level that is proportional to the signal generated by the control unit.

In the event of a lifting movement upwards, when the manoeuvring actuator is released, whereupon the second signal stops, the control unit can be disposed to automatically stop the contraction of the lifting hose. The control unit will in this position set the target value equal to the momentary actual value for the length of the lifting hose at the time when the second signal ceased. This means that the capacity of the vacuum source is adjusted to a lower value, or to zero, as a function of any leak flow. The lower value represents the lowest capacity of the vacuum source at which the first signal (actual value) stays constant or varies within an acceptable interval preprogrammed in the control unit. By means of the first signal generated on an ongoing basis, the control unit can control the capacity of the vacuum source to compensate for any undesirable height changes that can arise, for example a leakage flow in the system meaning that the pressure increases in the lifting hose and that any load suddenly begins to be lowered. For this purpose the control unit can comprise, for example, a built-in PID controller. The PID controller calculates the output signals of the control unit to the power adjustment unit, which in turn controls the vacuum source to a capacity level that is proportional to the output signals of the control unit.

A desired extension of the lifting hose can be achieved by the operator acting on the manoeuvring actuator of the manoeuvring device, which actuator generates at least a second signal, which represents a desired lowering. This second signal is sent to the control unit, which is disposed to first adjust the vacuum source to a lower capacity when the second signal represents a desired extension of the lifting hose. If adjustment of the vacuum source down to its lowest capacity (zero level) is not sufficient to achieve the desired lowering speed, the control unit can adjust a separate first valve, or lowering valve, to achieve a more rapid lowering. The first valve is disposed to be opened and adjusted to increase the pressure inside the lifting hose, whereby the degree of opening of the valve and the speed of opening and closing respectively influence acceleration, deceleration and lowering speed. Alternatively, the operator can act directly on the lowering valve, either via the control unit or manually, to achieve a desired lowering speed.

To avoid the lifting hose starting to swing like a spring with a suspended load when the lowering or lifting movement is to be stopped, the control unit can be disposed to adjust the lowering valve with the aid of the first signal. If the first signal indicates an undesirable cyclical variation of the length of the lifting hose, the control unit can adjust the lowering valve so that this is opened during periods of swinging movement calculated in the control unit to achieve an effective damping of the swinging.

The invention also relates to a lifting hose intended for a vacuum tube lifting device. The lifting hose comprises a first end for attachment of the lifting hose and connection to a vacuum source, and a second end for connection to a means, such as a lifting tool, disposed to couple the lifting hose to a load. The lifting hose comprises an arrangement disposed to measure a parameter proportional to the momentary length of the lifting hose.

The arrangement can comprise a mechanical measuring unit, e.g. a draw-wire encoder, one end of which is attached to the fixed first end of the lifting hose and the second end of which is attached to the mobile second end of the lifting hose. Alternatively, the arrangement comprises a range finder disposed to measure the length of the lifting hose between the mobile end of the lifting hose and a principally horizontal reference surface in the environment. According to the further alternative, the arrangement comprises a load cell disposed to generate a signal proportional to the length of the lifting hose between the fixed first end of the lifting hose and the mobile second end.

The invention also relates to a method for control of a vacuum tube lifting device comprising a lifting hose. The lifting hose has a first end for attachment of the lifting hose and a second end for connection to a means, such as a lifting tool, disposed to couple the lifting hose to a load. The lifting hose is also adapted for connection to an adjustable vacuum source and a control unit disposed to adjust the pressure inside the lifting hose by means of input signals with the aim of achieving an extending or contracting shifting movement of the lifting hose for vertical shifting of a load. The method comprises the following steps:

detection of a parameter proportional to the momentary length of the lifting hose, or a parameter proportional to a change in the momentary length of the lifting hose, generating of at least a first signal, which is used by the control unit to obtain an actual value, which represents the momentary length of the lifting hose, and adjustment of the pressure in the lifting hose in response to said actual value.

According to the method, the pressure inside the lifting hose can be adjusted to retain a constant length of the lifting hose. When the control unit detects that only the first signal is being generated, it is disposed to select a target value corresponding to the momentary actual value for the nearest preceding time when the adjustment of the length of the lifting hose ceased, i.e. when the second signal ceased. According to the method, a parameter proportional to the momentary length of the lifting hose is monitored and measured on an ongoing basis, continuously and/or intermittently, to detect any possible change in length of the lifting hose. The capacity of the vacuum source can be adjusted to a lower value that amounts to the capacity level at which the first signal corresponds to the target value or lies within a predetermined interval relative to the target value. If the lifting hose, pertinent components and a possible load are tight, then the lifting hose is free from leakage flows and the first signal indicates a constant length. In this case the vacuum source can be adjusted to a lower value equal to zero. If a possible leak exists in the system, this will give rise to a leakage flow. This leakage will increase the pressure in the lifting hose and mean that the first signal indicates an increased length. In this case the vacuum source can be adjusted to a lower value that corresponds to and compensates for the leakage flow. The lifting hose can thereby retain a constant length corresponding to said target value.

By adjusting the pressure inside the lifting hose, it is possible to achieve a change in the length of the lifting hose in response to a second signal, which represents a desired shifting movement. The control unit can calculate a target value corresponding to a desired shifting speed proportional to the second signal generated by the manoeuvring actuator. The control unit can also calculate an actual value corresponding to the momentary shifting speed by means of the generated first signal.

A desired contraction of the lifting hose can be achieved by the operator acting on a manoeuvring actuator, which generates at least a second signal, which represents a desired lifting. The second signal is sent to a control unit, which adjusts the vacuum source via the power adjustment unit. In response to the second signal, which represents a desired lifting of the load, a lowering of the pressure inside the lifting hose is carried out to achieve a reduction in the length. If the second signal represents a desired lifting of the lifting tool and any possible load, the capacity of the vacuum source is adjusted up to a value that results in the desired lifting movement. Maximal acceleration, speed and sensitivity to the lifting movement can be set in the control unit. By sending signals about the position from the arrangement for measuring the length of the lifting hose to the control unit, speed and acceleration can be calculated and achieve output signals from the control unit to a power adjustment unit, which controls the vacuum source to a level that is proportional to the signals from the control unit and that thereby generates the desired lifting movement.

A desired extension of the lifting hose can be achieved by the operator acting on the manoeuvring actuator, which generates at least a second signal, which represents a desired lowering. The control unit will then decide if the lowering valve needs to be opened to achieve the desired lowering. Alternatively, the operator can act directly on a separate first valve, or lowering valve, to achieve a desired lowering. In both cases a second signal is generated, which is sent to a control unit, which adjusts the capacity of the vacuum source up or down via the power adjustment unit. In response to a second signal, which represents a desired lowering of the load, an increase in the pressure inside the lifting hose is executed to achieve an increase in the length. If the second signal represents a desired lowering of the lifting tool and a possible load, the vacuum source is adjusted to a lower value, which results in the desired lowering movement, or to zero. Adjustment down to zero means that the lowering is achieved by means of a possible leak flow. The properties of the lowering valve, such as throughflow and response time, influence acceleration and lowering speed.

Due to the relatively high energy efficiency, the vacuum tube lift according to the invention is possible to install in a practical manner and use on battery-operated trucks where the stored quantity of energy limits the use of conventional vacuum tube lifters in the current situation to a more or less impractical level.

Since the pressure-bearing parts of the vacuum tube lift according to the invention are fully closed in the stand-by position and are only dependent in certain cases during a lifting cycle on pressure adjustment by the admission of only small volumes of atmospheric air, the noise level will be very low relative to a conventional vacuum tube lifter. In a conventional vacuum tube lifter, the excess capacity of the vacuum source must be adjusted away all the time in the lifting hose through a valve, through which a large air flow must be routed periodically, which causes flow noise from the valve. Air needs to flow through said valve on a conventional vacuum tube lifter both in the stand-by position and during a lifting cycle. Furthermore, the noise level from the vacuum source on a vacuum tube lift according to the invention will be sharply reduced as this will never need to generate more capacity than is required to execute a desired lifting cycle. The noise level caused by the vacuum source is normally in proportion to the capacity it generates. For example, a vacuum pump causes a higher noise level when its motor is working at full speed and generating maximum capacity than when it is working at a lower speed and generating lower capacity. A compressed-air-driven ejector causes more noise when the quantity of compressed air supplied amounts to the level that generates maximal capacity than it causes at lower capacity when a smaller quantity of compressed air is supplied.

Due to the mechanical measuring unit or corresponding range finder providing ongoing feedback, either continuously or intermittently, regarding the momentary length of the lifting hose, and thereby facilitating calculation in the control unit of speed and acceleration, the possibility is obtained of controlling the adjustable vacuum source and/or lowering valve, using selectable movement characteristics programmed into the control unit, in such a way that the movement characteristic of the vacuum tube lift can be selected to suit different users. For example, a beginner can make use of a characteristic that results in relatively slow movements, while an experienced operator uses a characteristic that provides a rapid response and high lifting speed. In this way, it is easy for a beginner to learn to use the vacuum tube lift with a certain movement characteristic, while an experienced user can maximise productivity by selecting another movement characteristic.

DESCRIPTION OF FIGURES

In the following text, the invention will be described with reference to the enclosed figures. These schematic figures are only intended to illustrate the invention and are not intended to limit the protective scope of the invention in any way.

EMBODIMENTS OF THE INVENTION

Figure 1:
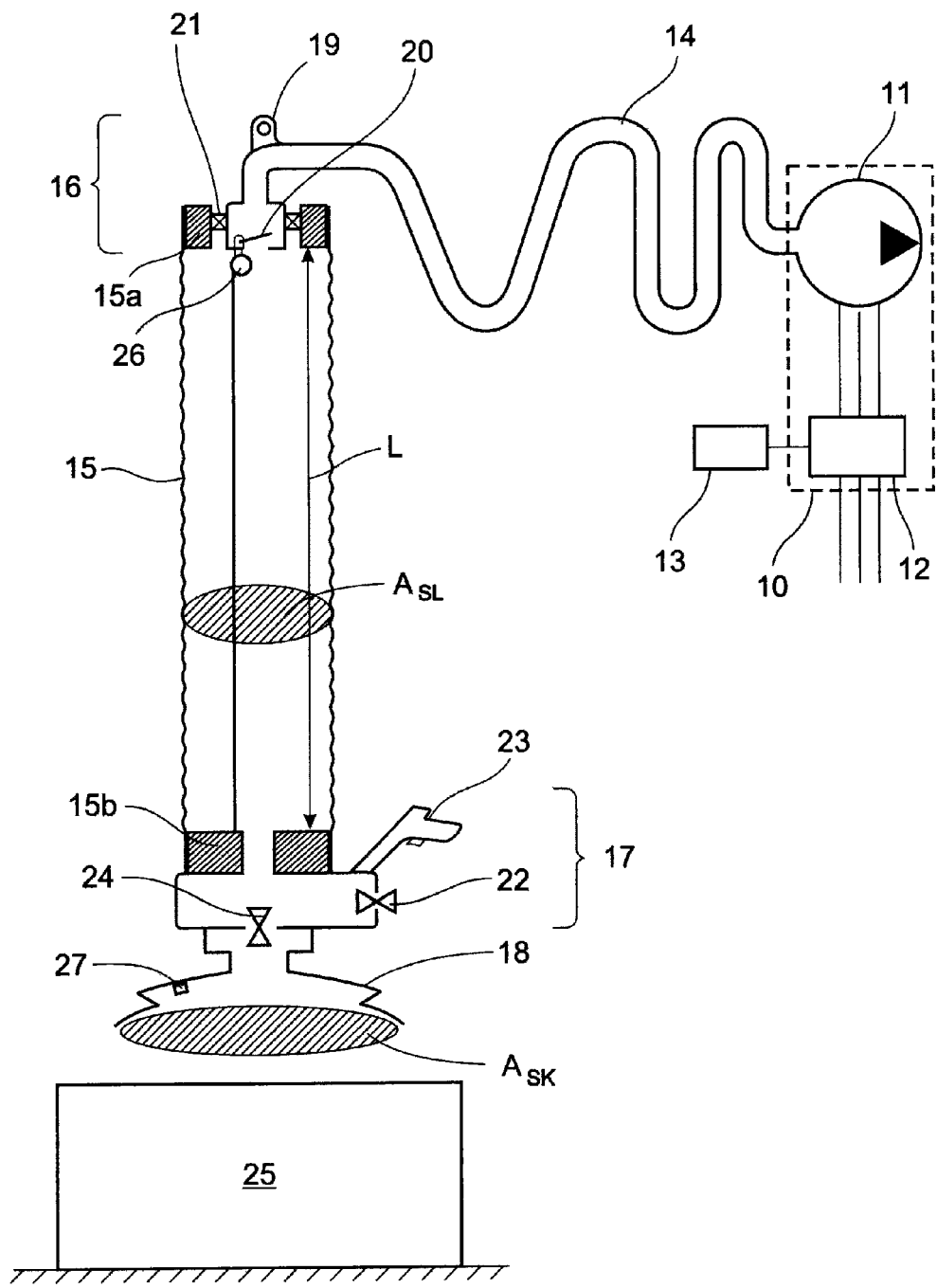
FIG. 1 shows a schematic illustration of a vacuum tube lifting device according to the invention.

FIG. 1 shows a schematic illustration of a vacuum tube lifting device according to the invention. The vacuum tube lifting device comprises a controllable vacuum-generating unit 10 provided with a vacuum source 11, for example in the form of an electrically driven vacuum pump, the capacity of which can be adjusted by a power adjustment unit 12, for example in the form of a frequency controller. The vacuum tube lifting device is controlled by a programmable control unit 13, for example a microcontroller, in response to at least one input signal from a manoeuvring actuator 23 and signals from one or more sensors as described below.

The vacuum source 11 is connected to a feed hose 14, which in turn is connected to a lifting hose 15. The upper end 15a of the lifting hose 15 is suspended in a top swivel 16 and its lower end 15b carries a manoeuvring device 17 and a suction cup 18. The top swivel 16 comprises, apart from a connection for the feed hose 14, a suspension eye 19 for suspension in e.g. a traversing system (not shown). In addition, the top swivel 16 comprises a check valve 20 to prevent vacuum loss in the lifting hose 15 when the vacuum source 11 stops or when its capacity falls, and a bearing 21 to render the lifting hose 15 freely rotatable around the suspension eye 19. The check valve 20 is shown here in its open position, which position is assumed when the vacuum source 11 is in operation. The check valve 20 is preferably controlled entirely mechanically to its closed position, which it assumes when the lifting hose 15 is held at a certain height, without any leakage flows, or when the lifting hose 15 is lowered. The check valve is closed by means of a pressure drop across the valve in those cases when the pressure in the feed hose is higher than the pressure in the lifting hose.

The manoeuvring device 17 comprises a first valve in the form of a lowering valve 22, which in this example is electrically controlled. The manoeuvring device 17 is provided with a manoeuvring actuator 23 with suitable elements, for example buttons, for electrical control of the vacuum source 11 and/or lowering valve 22 via the programmable control unit 13 and the power adjustment unit 12 to achieve extension of the lifting hose 15, i.e. lowering of the mobile end 15b of the lifting hose 15. The manoeuvring actuator 23 of the manoeuvring device 17 is also provided with suitable elements for the electrical control of the vacuum source 11 via the programmable control unit 13 and power adjustment unit 12 in connection with the contraction of the lifting hose 15, i.e. raising of the mobile end 15b of the lifting hose 15. The manoeuvring actuator 23 for raising and lowering can comprise of the same actuator (e.g. a joystick) or separate actuators, which actuators are preferably, but not necessarily, steplessly adjustable.

The manoeuvring actuator 23 can alternatively comprise elements for electrical control of the lowering valve 22, or the lowering valve 22 can be manually controlled by manual force. FIG. 1 shows only one example of the placement of the control unit 13, in this case connected to the controllable vacuum-generating unit 10. Suitable alternative placements can be made in connection with the top swivel 16 or manoeuvring device 17. FIG. 1 does not show the electrical couplings or signal lines between the various components of the manoeuvring device 17 and the programmable control unit 13. The transmission of control signals, sensor signals and the like can be carried out by physical cables or wirelessly, depending on the most suitable solution in each case.

The manoeuvring device 17 also comprises a second valve in the form of a bottom valve 24 for opening and closing an opening between the suction cup 18 and the lifting hose 15. The bottom valve 24 in this example is electrically controlled with the aid of a sensor 27 (shown schematically), whereby the control unit 13 opens the bottom valve 24 automatically when a load 25 is situated immediately below the suction cup 18, or when the suction cup 18 comes into contact with the load 25. Alternatively, the bottom valve 24 can be acted upon mechanically, whereby an operator controls the opening and closing of this. Alternatively, a mechanical device can open the bottom valve 24 when this device senses that the suction cup 18 is placed on the load 25. When the bottom valve 24 is opened, the programmable control unit 13 generates output signals to the power adjustment unit 12, which increases the capacity of the vacuum source 11 so that the suction cup 18 is held fast by suction on the load 25.

According to the invention, the vacuum tube lifting device comprises an arrangement disposed to measure in an ongoing manner a parameter proportional to the momentary length L of the lifting hose 15. In this example, the measuring takes place continuously, wherein a first signal is emitted as an actual value to the programmable control unit 13, following which the control unit 13 is disposed to automatically adjust the vacuum source 11 via the power adjustment unit 12 for the purpose of adjusting the pressure in the lifting hose 15 to a target value, starting out from said actual value. Alternatively, measurement can take place intermittently or by a combination of continuous and intermittent measurement, depending on the degree of utilisation of the device.

According to the example in FIG. 1, the arrangement comprises a range finder, which comprises of a mechanical measuring unit 26, e.g. a draw-wire encoder, one end of which is attached to the fixed first end 15a of the lifting hose 15 at the top swivel 21 and the second end of which is attached to the mobile second end 15b of the lifting hose at the manoeuvring device 17. An absolute sensor can be used to provide an exact value for the momentary length L of the lifting hose 15. The pulse generator gives the measured values with the desired accuracy and can use e.g. optical or magnetic sensors.

Figure 2:
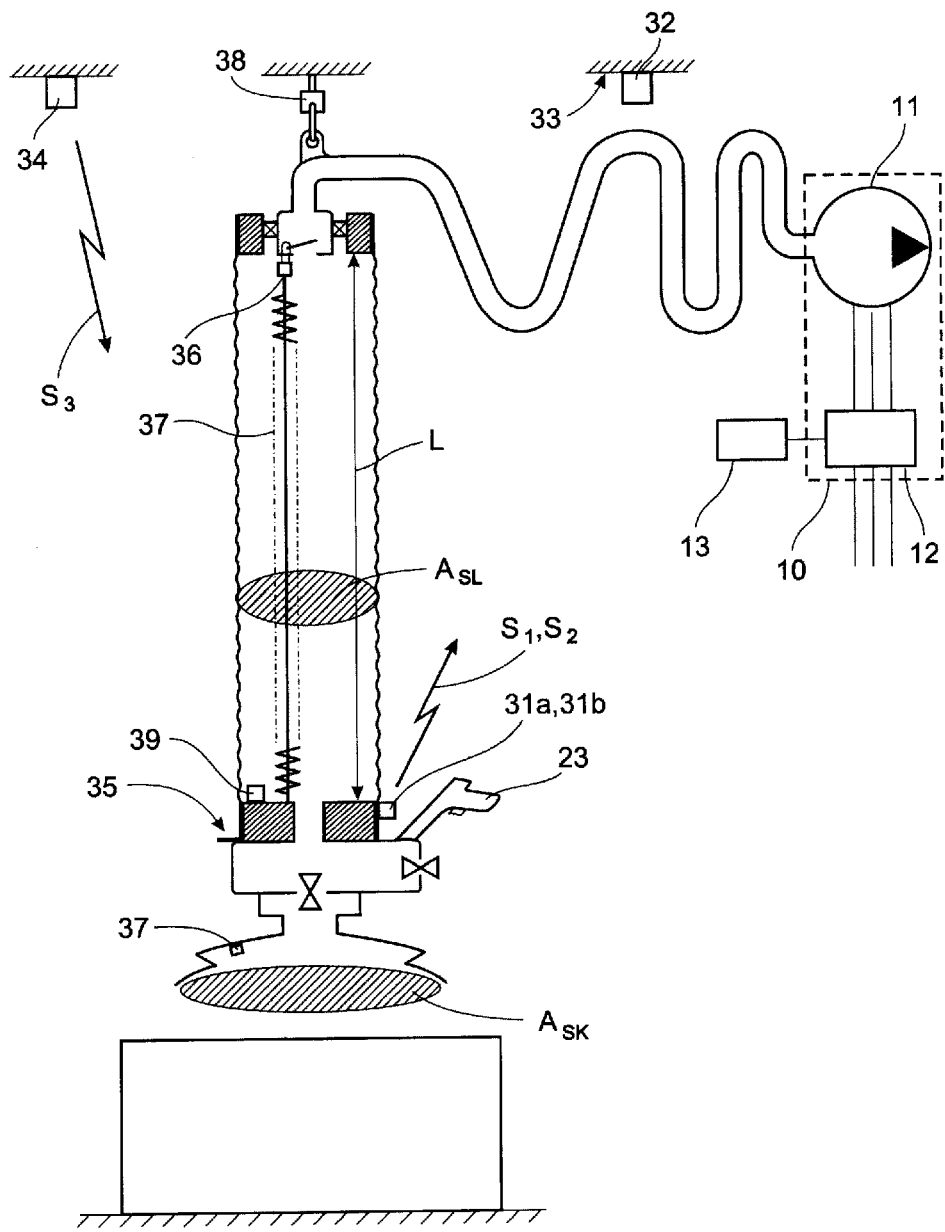
FIG. 2 shows a schematic illustration of an alternative vacuum tube lifting device according to the invention.

FIG. 2 shows a schematic illustration of an alternative vacuum tube lifting device according to the invention. The vacuum tube lifting device comprises a controllable vacuum-generating unit 10 with a vacuum source 11 and a power adjustment unit 12 connected to a feed hose, in a corresponding manner to FIG. 1. FIG. 2 shows schematically a number of alternative arrangements for measuring the length of the lifting hose in addition to the first example above.

According to a second example, the arrangement comprises a contactless range finder disposed to measure the length of the lifting hose between the mobile end 15b of the lifting hose and at least one reference surface. The reference surface can comprise preferably, but not necessarily, of a principally horizontal reference surface in the environment. For example, a transmitter 31a arranged at the lower end 15b of the lifting hose can transmit a signal S1 to a receiver 32, which signal is used to calculate the position of the transmitter 31a and thereby the momentary length L of the lifting hose. Alternatively, a transmitter/receiver 31b can be used to emit a signal S2 to measure the distance between the transmitter/receiver 31b and a reference surface 33 (e.g. a ceiling) vertically above this. Examples of such range finders are contactless meters in which the distance between two points is measured by laser or ultrasound, for example. Alternatively, a range finder 34 can be placed on a reference position and measure the distance to a reference surface 35 on the lower part of the lifting hose by a signal S3.

According to a third example, the arrangement comprises at least one load cell 36 disposed to generate a signal proportional to the length L of the lifting hose between the fixed first end 15a and mobile second end 15b of the lifting hose (see FIG. 1). For example, a load cell 36 can be connected to a flexible or elastic element 37, for example a helical spring, which extends at least partly along the vertical extension of the lifting hose 15, between the mobile end 15b of the lifting hose 15 and a reference position. The load cell 36 measures the spring force in the flexible element 37 and generates a signal that is proportional to the momentary length L of the lifting hose 15. This signal is sent to the control unit 13, which calculates the momentary length L of the lifting hose 15 by means of signals and the spring constant of the flexible element 37.

According to a fourth example, the arrangement comprises at least one load cell 38 disposed to generate a signal proportional to the weight of a possible load that is carried by the vacuum tube lifter, and an underpressure sensor 39 mounted inside the lifting hose, disposed to generate a signal that represents the momentary underpressure in the lifting hose. These signals are sent to the control unit 13, which calculates the momentary length L of the lifting hose 15 between the fixed first end 15a and mobile second end 15b of the lifting hose 15 (see FIG. 1), by weighing together the signals for the weight of the load 25 and the underpressure in the lifting hose 15 with given data that characterise how the length of the lifting hose 15 behaves as a function of the level of these signals. By using sensors for both weight and underpressure, sudden vertical movements can be avoided in this example if the weight of the load changes, for example, during a lifting or lowering movement, or if the weight of the load changes when the load is to be balanced at a constant height. This is achieved by the control unit receiving updated signals all the time for the parameter or parameters that is/are used by the control unit to calculate the length of the lifting hose.

The function of the device is described below with reference to FIG. 1. Initially, before an operator activates the vacuum tube lifting device, all valves 22, 24 are closed, so that the lifting hose 15 and the feed hose 14 form a closed volume only connected to the vacuum source 11. When the vacuum tube lift is started, the vacuum source 11 begins to suck air out of the lifting hose 15 until the control unit 13 has received a signal from the mechanical measuring unit 26 corresponding to an actual value for the length of the lifting hose, which amounts to a value that corresponds to a target value preprogrammed in the control unit for the length L of the lifting hose. When the actual value amounts to the target value preprogrammed in the control unit 13, the control unit 13 adjusts the capacity of the vacuum source 11 downwards via the power adjustment unit 12 to a level that results in the length L of the lifting hose 15 being kept constant. If a leakage should occur into the lifting hose 15, this will cause a pressure increase in the lifting hose 15. A pressure increase in the lifting hose 15 means that the length of the lifting hose 15 is increased, which is indicated to the control unit 13 by the actual value originating from the mechanical measuring unit 26. The control unit 13 then generates a changed signal to the power adjustment unit 12, which increases the capacity of the vacuum source 11, in proportion to the signal, to a level that means that the actual value is equal to the target value. The control unit 13 is equipped, for example, with a PID controller to generate optimal control signals with regard to the capacity level of the vacuum source 11.

When the operator is to start a lift with a load 25, the vacuum tube lifter is moved possibly towards the load 25 in a horizontal direction, at the same time as the operator manoeuvres the manoeuvring actuator 23 to approach the load 25 vertically, e.g. from above. When the sensor 27 in the suction cup 18 detects that the suction cup 18 is located close to or on the load 25, the bottom valve 24 is opened and air begins to be sucked through the suction cup 18. When the suction cup 18 is applied to the load 25, a more or less tight joint is formed between the suction cup 18 and the lifted load 25 against the environment, whereupon the air is sucked out of the suction cup 18 and the lifting hose 15, which results in a lower pressure level in the suction cup 18 and the lifting hose 15 than in the environment. At a pressure level in the lifting hose 15 that together with the effective area $A_{SL}$ of the lifting hose 15 forms a contracting force in the vertical direction of the lifting hose 15 that exceeds the weight of the load 25, the lifting movement commences. The pressure level in the lifting hose 15 and suction cup 18 amounts to the same value, which results in the suction cup 18 being attached to the load 25 with a force that amounts to the force created by the pressure level in the lifting hose 15 and the effective area $A_{SK}$ of the suction cup 18. By selecting a suction cup 18 with an effective area $A_{SK}$ greater than the effective area $A_{SL}$ of the lifting hose, it is ensured that the load 25 is always attached to the suction cup 18 with a force that is greater than the contracting force of the lifting hose 15. The bottom valve 24 is open during the entire time that the load 25 is held fast to the suction cup 18. The operator controls the direction and speed of the lifting movement by adjusting the manoeuvring actuator 23, which via the control unit 13 and via the power adjustment unit 12 adjusts the capacity of the vacuum source 11 and via the control unit 13 adjusts the lowering valve 22. Maximal acceleration, speed and sensitivity can be programmed into the control unit 13. By sending signals indicating the momentary length L of the lifting hose from the mechanical measuring unit 26 to the control unit 13, the speed and acceleration can be calculated and output signals produced from the control unit 13 to the lowering valve 22 and to the power adjustment unit 12, which adjusts the capacity of the vacuum source 11 to a level calculated by the control unit 13. When the manoeuvring actuator 23 is released, the control unit 13 stops the lifting movement. The control unit 13 will now, by means of the inbuilt PID controller, generate signals to the power adjustment unit 12 and thereby adjust the capacity of the vacuum source 11 to a level that compensates for any undesirable length changes in the lifting hose 15, which can arise e.g. due to some part of the vacuum tube lift or the lifted load suddenly beginning to leak air during lifting of a load 25 or due to the weight of the lifted load being changed during the lift.

An energy saving occurs in that the capacity of the vacuum source 11 is automatically adapted during a lifting cycle to the level required for accomplishing the desired movements of the lifting hose 15, instead of always generating full capacity as in the case of a conventional vacuum tube lifter, which level is then obtained by manually controlled leakage flows in the lifting hose 15 to result in desired pressure levels in the lifting hose 15. The full capacity of the vacuum source 11 will only need to be utilised exceptionally with the invention, for example in a lifting movement upwards with a heavy leaking load 25. The capacity of the vacuum source 11 will be utilised on the whole primarily in a lifting movement upwards, i.e. when the lifting hose is contracted. When the load 25 stands still vertically, the vacuum source 11 is automatically adjusted down to zero level or adjusted automatically down to a capacity that corresponds exactly to any leak flows through the load 25. When the load 25 is to be lowered, the vacuum source 11 can be adjusted down to zero level or adjusted down to a level where the leak flows are not fully compensated for, whereupon the pressure in the lifting hose increases and the hose is extended, i.e. the lifted load 25 is lowered. The lowering, i.e. extension of the lifting hose 15, takes place alternatively in that the vacuum source 11 is adjusted down to zero level and in that the lowering valve 22 is opened and lets just the right amount of air of atmospheric pressure into the lifting hose 15 to achieve a rise in pressure in the lifting hose 15, which results in the lowering movement and finally in the load 25 being released. Energy saving also occurs in that the mobile second end 15b of the lifting hose can balance at a suitable height in a stand-by position, i.e. without a load 25, without some part of the capacity of the vacuum source 11 needing to be utilised more than by way of exception. Some part of the capacity of the vacuum source 11 will be utilised in the stand-by position only for short periods to compensate over time for any small leakage that may take place in the vacuum tube lift.

Figure 3:
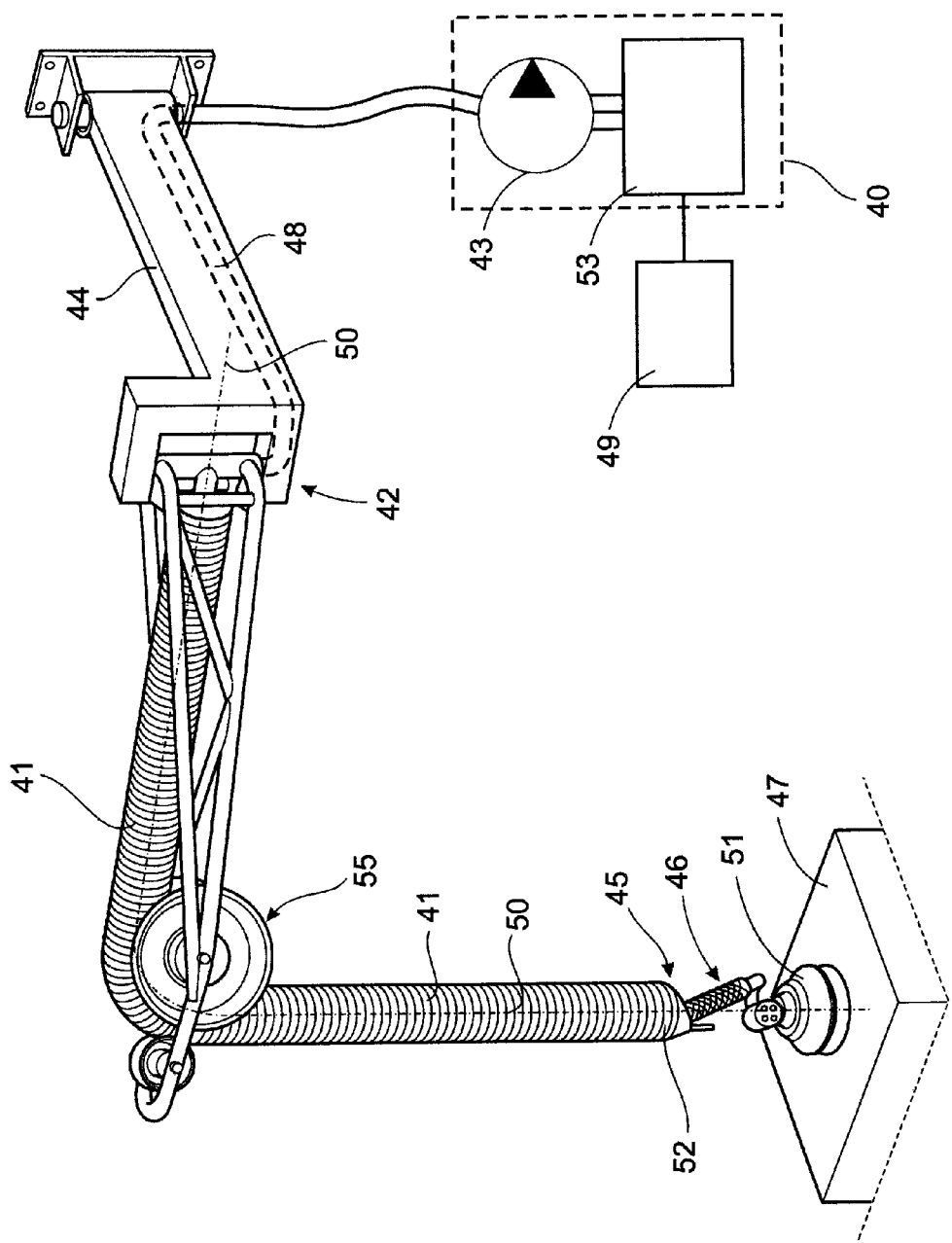
FIG. 3 shows a schematically illustrated further alternative vacuum tube lifting device according to the invention.

FIG. 3 shows a schematically illustrated alternative vacuum tube lifting device comprising a lifting hose 41, which is connected at a first end 42 to a vacuum source 43 and fastened on a bracket 44. This arrangement permits lifting of a load 47 in a space with a restricted ceiling height, e.g. a container or the like. Arranged at the second mobile end 45 of the lifting hose 41 is a means 46 for coupling the lifting hose 41 to a load 47. In the execution illustrated, the lifting hose 41 is connected to a vacuum source 43 via the bracket 44, in that the bracket 44 has a hose 48 or a duct internally that connects the lifting hose 41 and the vacuum source 43. The vacuum source 43 forms a part of a controllable vacuum-generating unit 40 comprising the vacuum source 53, for example in the form of an electrically driven vacuum pump, the capacity of which can be adjusted using a power adjustment unit 53. The vacuum source 43 and a related control system 49 are only illustrated schematically. The control unit 49 corresponds to the control unit 13 in FIG. 1. The vacuum source 43 is preferably connected to the first end 42 as illustrated.

The lifting hose 41 is arranged on a bracket 44, to which a support unit 55 is also fastened via stays. It is to be emphasised that the lifting hose 41 can be attached in another way by means of suspension apparatus suitable for the purpose, and that various suspension apparatuses can be used for the lifting hose 41 as well as for the support unit 55. The lifting hose 41 and/or the support unit 55 can be fastened to a fixed or mobile unit. A mobile unit can be a pivoting arm or a traversing system, for example. In the case of fastening in a fixed unit, some form of bracket is expediently used that is arranged on a floor, a wall or suspended from a ceiling. The lifting hose 41 and/or the support unit 55 should also be able to be arranged substantially directly on a ceiling or a wall and/or directly on the vacuum source 43.

In the example illustrated in FIG. 3, the suction cup 51 is thus connected to the vacuum source 43 via the lifting hose 41 for adjustment of the pressure inside the lifting hose 41 and suction cup 51 by means of a control unit 49. Even if it is advantageous in some cases for the connecting means 46 to comprise a suction cup 51, it should be pointed out that the invention does not require the use of a suction cup, but can be applied together with any connection means, such as several suction cups, for example, or a hook.

The lifting hose 41 is extensible and contractible in its longitudinal direction in order, by adjustment of the pressure inside the lifting hose 41, to produce an extending or contracting shifting movement of the lifting hose 41 for shifting a load 47. The lifting hose 41 is arranged for substantially vertical shifting during a certain part of the lifting movement and for substantially horizontal shifting during another part of the lifting movement. The arrangement in FIG. 3 comprises corresponding valves and manoeuvring actuators as described in connection with FIG. 1 above.

In the same way as in the example in FIG. 1, the arrangement in FIG. 3 comprises a range finder, which comprises of a mechanical measuring unit (indicated dashed in FIG. 3) in the form of a draw-wire encoder 50, one end of which is attached to a position at a given distance from the first end 42 of the lifting hose, and the other end of which is fastened to the mobile second end 52 of the lifting hose at the manoeuvring device. The draw-wire 50 can be placed in a protective sheath that runs past the support unit 55 and slides relative to the lifting hose 41 when this is extended or contracted. Alternatively, the draw-wire can run over a support wheel and past the support unit when the lifting hose is extended or contracted. According to a further alternative, a draw-wire encoder can be mounted along the outside of the hose between the support unit and the mobile second end of the lifting hose. According to a further alternative, a first end of a draw-wire encoder can be fastened internally in the lifting hose on a bracket provided for this purpose at a place close to the support unit and its other end fastened internally in the lifting hose at the mobile second end of the lifting hose.

The alternative measuring devices described in connection with FIG. 2 can also be applied to a vacuum tube lifter according to FIG. 3.

The invention is not restricted to the embodiments indicated above, but can be varied freely within the scope of the enclosed claims. For example, the invention is not restricted to being used only together with the vacuum tube lifters as described above, but can be applied to all types of vacuum tube lifter that comprise a lifting hose connected to a lifting tool. Alternative vacuum tube lifters are described, for example, in Swedish patent SE 525 903 C.

The invention claimed is:

1. Vacuum tube lifting device comprising a lifting hose (15), which lifting hose (15) has a first end (15*a*) for attachment of the lifting hose (15) and a second end (15*b*) for connection to a means (17, 18) disposed to couple the lifting hose (15) to a load (25), an adjustable vacuum source (11) connected to the lifting hose (15), at least a first valve (22) connected to the lifting hose (15), and a control unit (13), disposed to adjust the pressure inside the lifting hose (15) by means of input signals for the purpose of achieving an extending or contracting shifting movement of the lifting hose (15) for shifting of a load (25), wherein the device comprises an arrangement (26; 31*a*; 31*b*; 34; 36; 38; 39) disposed to detect in an ongoing manner at least one parameter proportional to the momentary length of the lifting hose (15) or a parameter proportional to a change in the momentary length of the lifting hose (15), and to emit to the control unit (13) at least a first signal, which is used by the control unit (13) to obtain an actual value for the momentary length of the lifting hose (15) in said control unit (13), and that said control unit (13) is disposed to automatically adjust the vacuum source (11) and/or the first valve (22) for the purpose of adjusting the length of the lifting hose (15) from a momentary actual value to a desired target value.

2. Vacuum tube lifting device according to claim 1, wherein the arrangement comprises a range finder that comprises a mechanical measuring unit (26), one end of which is attached to a reference position at a given distance from the fixed first end (15*a*) of the lifting hose (15) and the other end of which is attached to a position at a given distance from the mobile second end (15*b*) of the lifting hose (15).

3. Vacuum tube lifting device according to claim 1, wherein the arrangement comprises a contactless range finder (31*a*; 31*b*; 34) disposed to measure the momentary length of the lifting hose (15) between the mobile end (15*b*) of the lifting hose and a reference position (33; 35).

4. Vacuum tube lifting device according to claim 1, wherein the arrangement comprises a load cell (36) disposed to measure the tensile force in a flexible device (37) connected between the mobile end (15*b*) of the lifting hose and a reference position (15*a*), and to generate from the measured tensile force a signal proportional to the momentary length of the lifting hose (15) between the fixed first end (15*a*) and mobile second end (15*b*) of the lifting hose.

5. Vacuum tube lifting device according to claim 1, wherein the arrangement comprises a load cell (38) disposed to measure the weight of the load (25) and a vacuum sensor (39) disposed to measure the pressure level in the lifting hose (15), and wherein the control unit (13) is disposed to weigh together the output signals of the sensors to an actual value representing the momentary length of the lifting hose (15).

6. Vacuum tube lifting device according to claim 1, wherein the control unit (13) is disposed to adjust the vacuum source (11) to retain a constant length of the lifting hose (15) if only a first signal is generated.

7. Vacuum tube lifting device according to claim 1, wherein the control unit (13) is disposed to select a target value corresponding to the momentary actual value at the time when the influence of the manoeuvring actuator (23) ceases.

8. Vacuum tube lifting device according to claim 1, wherein the manoeuvring actuator (23) is disposed to generate a second signal, which represents a target value for a desired change in the length of the lifting hose (15), and wherein the control unit (13) is disposed to adjust the vacuum source (11) to produce a change of length.

9. Vacuum tube lifting device according to claim 1, wherein the manoeuvring actuator (23) is disposed to generate a second signal, which represents a target value for the speed of an extending or contracting movement of the length of the lifting hose (15), and wherein the control unit (13) is disposed to adjust the vacuum source (11) to produce the rate of movement.

10. Vacuum tube lifting device according to claim 9, wherein the control unit (13) is disposed to calculate an actual value corresponding to the momentary shifting speed by means of the generated first signal.

11. Vacuum tube lifting device according to claim 8, wherein the control unit (13) is disposed to adjust the vacuum source (11) to an increased capacity if the second signal represents a desired contraction of the lifting hose (15).

12. Vacuum tube lifting device according to claim 8, wherein the control unit (13) is disposed to adjust at least the vacuum source (11) to a lower capacity if the second signal represents a desired extension of the lifting hose (15).

13. Vacuum tube lifting device according to claim 12, wherein the control unit (13) is disposed to adjust the first valve (22) if the second signal represents a desired extension of the lifting hose (15).

14. Vacuum tube lifting device according to claim 9, wherein the control unit (13) is disposed to calculate a target value corresponding to a desired shifting speed proportional to the second signal generated by the manoeuvring actuator (23).

15. Lifting hose intended for a vacuum tube lifting device, which lifting hose (15) comprises a first end (15*a*) for attachment of the lifting hose (15) and connection to a vacuum source (11), and a second end (15*b*) for connection to a means (17, 18) disposed to couple the lifting hose (15) to a load (25), wherein the lifting hose (15) comprises an arrangement (26) disposed to detect a parameter proportional to the momentary length of the lifting hose or a parameter proportional to a change in the momentary length of the lifting hose.

16. Lifting hose according to claim 15, wherein the arrangement comprises a range finder that comprises a mechanical measuring unit (26), one end of which is attached to a reference position at a given distance from the fixed first end (15*a*) of the lifting hose and the other end of which is attached to a position at a given distance from the mobile second end (15*b*) of the lifting hose.

17. Lifting hose according to claim 15, wherein the arrangement comprises a contactless range finder (31*a*; 31*b*; 34) disposed to measure the length of the lifting hose (15) between the mobile end (15*b*) of the lifting hose and a reference position (33; 35).

18. Lifting hose according to claim 15, wherein the arrangement comprises a load cell (36) disposed to measure the tensile force in a flexible device (37) connected between the mobile end (15*b*) of the lifting hose and a reference position (15*a*), and to generate a signal proportional to the momentary length of the lifting hose (15) between the fixed first end (15*a*) and mobile second end (15*b*) of the lifting hose.

19. Method for control of a vacuum tube lifting device comprising a lifting hose (15), the lifting hose (15) has a first end (15*a*) for attaching the lifting hose (15) and a second end (15*b*) for connection to a means (17, 18) disposed to couple the lifting hose (15) to a load (25), an adjustable vacuum source (11) connected to the lifting hose (15), at least a first valve (22) connected to the lifting hose (15), a manoeuvring actuator (23) for controlling the lifting hose (15) vertically, and a control unit (13) disposed to adjust the pressure inside the lifting hose (15) by means of input signals for the purpose of producing an extending or contracting shifting movement of the lifting hose (15) for shifting of a load (25), wherein the method comprises the following steps:

measurement of a parameter proportional to the momentary length of the lifting hose (15), or a parameter proportional to a change in the momentary length of the lifting hose (15), generating of at least a first signal, which is used by the control unit (13) to obtain an actual value, which represents the momentary length of the lifting hose (15), generating of a second signal as a target value, which represents a desired change in the length of the lifting hose (15), adjustment of the vacuum source (11) and/or of the first valve (22) for the purpose of adjusting the length of the lifting hose (15) from a momentary actual value to a desired target value.

20. Method according to claim 19, wherein the pressure inside the lifting hose (15) is adjusted by the vacuum source (11) to retain a constant length of the lifting hose (15) corresponding to said actual value when only a first signal is generated.

21. Method according to claim 19, wherein the control unit (13) selects a target value corresponding to the momentary actual value at the time when generation of the second signal ceases.

22. Method according to claim 19, comprising adjustment of at least the vacuum source (11) to an increased capacity if the second signal represents a desired contraction of the lifting hose (15).

23. Method according to claim 19, comprising adjustment of at least the vacuum source (11) to a lower capacity if the second signal represents a desired extension of the lifting hose (15).

24. Method according to claim 19, comprising by adjustment of the first valve (22) if the second signal represents a desired extension of the lifting hose (15).

25. Method according to claim 22, wherein the control unit (13) calculates a target value corresponding to a desired shifting speed proportional to the second signal generated by the manoeuvring actuator (23).

26. Method according to claim 19, wherein the control unit (13) calculates an actual value corresponding to the momentary shifting speed by means of the generated first signal.

\* \* \* \* \*